(12) United States Patent
Yoo et al.

(10) Patent No.: US 12,482,832 B2
(45) Date of Patent: Nov. 25, 2025

(54) SEPARATOR ASSEMBLY FOR FUEL CELL AND FUEL CELL STACK INCLUDING THE SAME

(71) Applicants: Hyundai Motor Company, Seoul (KR); Kia Corporation, Seoul (KR)

(72) Inventors: Jin Hyeok Yoo, Yongin-Si (KR); Sun Do Shin, Yongin-Si (KR); Kyung Min Kim, Namyangju-Si (KR); Byung Gun Song, Gwangju-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 540 days.

(21) Appl. No.: 17/860,327

(22) Filed: Jul. 8, 2022

(65) Prior Publication Data
US 2023/0033394 A1 Feb. 2, 2023

(30) Foreign Application Priority Data
Jul. 27, 2021 (KR) .......... 10-2021-0098632

(51) Int. Cl.
*H01M 8/0258* (2016.01)
*H01M 8/0267* (2016.01)
*H01M 8/2485* (2016.01)

(52) U.S. Cl.
CPC ....... *H01M 8/0258* (2013.01); *H01M 8/0267* (2013.01); *H01M 8/2485* (2013.01)

(58) Field of Classification Search
CPC . H01M 8/0258; H01M 8/0267; H01M 8/2485
See application file for complete search history.

(56) References Cited

U.S. PATENT DOCUMENTS

| 7,833,673 B2 | 11/2010 | Morimoto et al. |
| 8,298,715 B2 | 10/2012 | Hayashi et al. |
| 2009/0286121 A1* | 11/2009 | Morimoto ........... H01M 8/1004 429/494 |

(Continued)

FOREIGN PATENT DOCUMENTS

| JP | 2010 009979 | 1/2010 |
| JP | 2010 055858 | 3/2010 |

(Continued)

*Primary Examiner* — James Lee
(74) *Attorney, Agent, or Firm* — Morgan Lewis & Bockius LLP

(57) ABSTRACT

A separator assembly for a fuel cell able to prevent deformation of a separator due to a flow pressure of a reaction gas at a first reaction gas inlet, and a fuel cell stack including the same includes: a first separator on one face of which is formed with a first reactive surface over which first reaction gas flows to allow for first reaction gas and second reaction gas to react and on the other face of which is formed with a first cooling surface where cooling occurs; a second separator on one face of which is formed a second reactive surface positioned to face the first reactive surface of the first separator, over which second reaction gas flows to allow for first reaction gas and second reaction gas to react, and on the other face of which is formed a second cooling surface where cooling occurs; and a reinforcing plate which is positioned in a region of the first separator where first reaction gas enters, preventing deformation of the first separator.

19 Claims, 9 Drawing Sheets

(56) References Cited

U.S. PATENT DOCUMENTS

2011/0033781 A1* 2/2011 Chin ................. B29C 45/14778
                                                       429/510
2012/0270131 A1* 10/2012 Fukuta ................ H01M 8/2457
                                                       429/454
2019/0288321 A1* 9/2019 Kajiwara ............ H01M 8/1004

FOREIGN PATENT DOCUMENTS

| KR | 10 0805458 | 2/2008 |
|----|------------|--------|
| KR | 10 2011 0029707 | 3/2011 |
| KR | 10 2012 0061233 | 6/2012 |
| KR | 10 2017 0140839 | 12/2017 |
| KR | 10 2019 0104548 | 9/2019 |

* cited by examiner

-PRIOR ART-

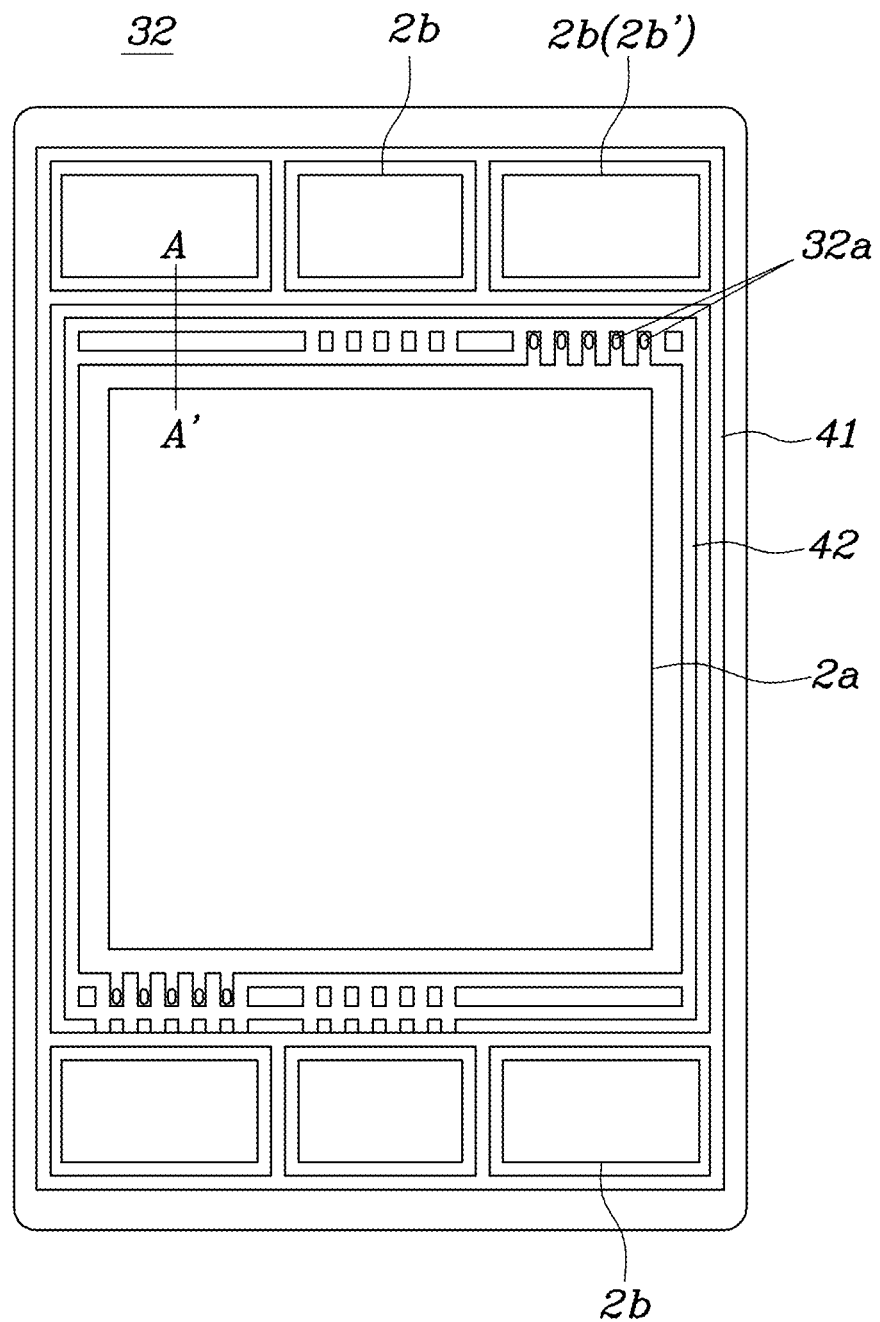

-PRIOR ART-

SEPARATOR ASSEMBLY FOR FUEL CELL AND FUEL CELL STACK INCLUDING THE SAME

CROSS REFERENCE TO RELATED APPLICATION

The present application claims priority to Korean Patent Application No. 10-2021-0098632, filed Jul. 27, 2021, the entire contents of which is incorporated herein for all purposes by this reference.

BACKGROUND OF THE PRESENT DISCLOSURE

Field of the Present Disclosure

The present disclosure relates to a separator assembly for a fuel cell, and a fuel cell stack including the same. More specifically, the present disclosure relates to a separator assembly for a fuel cell able to prevent deformation of a separator due to a flow pressure of a reaction gas at a hydrogen inlet, and a fuel cell stack including the same.

DESCRIPTION OF RELATED ART

A fuel cell is a type of power-generating apparatus which converts chemical energy of fuel into electrical energy through electrochemical reaction within a stack, with applications for providing electricity to industry and households, vehicle driving power and also for small electronic devices such as mobile devices. As a highly efficient and clean energy source, fuel cells are being used in an increasing number of areas.

FIG. 1 is a drawing illustrating the configuration of a generic fuel cell stack.

As may be known from FIG. 1, a membrane-electrode assembly (MEA) is positioned at the innermost part of a unit cell including a generic fuel cell stack, the present membrane-electrode assembly 10 comprised of a polymer electrolyte membrane 11 able to move hydrogen cations (protons), catalyst layers applied to both faces of the polymer electrolyte membrane to allow the hydrogen to react with oxygen, that is, a fuel electrode (anode) 12, and an air electrode (cathode) 13.

Furthermore, on the outside portions of the membrane-electrode assembly 10, that is, on the edges where the anode 12 and the cathode 13, a pair of gas diffusion layers (GDL) 20 is stacked, and outside the gas diffusion layers 20 is positioned a separator assembly 30 on which is formed a flow field to supply fuel and discharge water generated by a reaction, with a gasket 40 located between.

Here, the separator assembly 30 is formed by an anode separator 31 positioned on a fuel electrode (anode) and a cathode separator 32 positioned on an air electrode (cathode), which face and are joined with one another.

Meanwhile, a fuel cell stack is comprised by a plurality of stacked unit cells, and an end plate 50 is assembled onto the outermost stacked unit cell to support and hold in place the respective elements stated in the above.

Here, an anode separator 31 positioned on any provided stacked cell is positioned so that it is in contact with a cathode separator 32 of another adjacently positioned unit cell.

To facilitate the stacking of unit cells and to maintain alignment of the unit cells, a unit cells configured using a separator assembly 30 in which the contacting cathode separator 32 and anode separator 31 of a pair of adjacent unit cells are unified into a single unit.

Here, the anode separator 31 and cathode separator 32 of a separator assembly 30 are joined into a single unit, so that their manifolds are in communication with each other and their reactive regions are positioned in the same position.

Meanwhile, in a separator assembly 30, the plurality of manifolds and reactive regions are spaces where reaction gas or cooling water enters, exits or flows, and for airtightness an airtight line is formed along the perimeter by a gasket.

Normally, an airtight line is formed by extruding a rubber gasket 40 having a certain thickness on the surface of at least one of an anode separator 31 and a cathode separator 32.

The gasket 40 may be formed in various ways. For example, the gasket may be formed not on an anode separator 31, and instead formed on a cathode reactive surface and cathode cooling surface of a cathode separator 32.

FIG. 2A is a drawing illustrating an anode separator including a generic fuel cell stack, FIG. 2B is a drawing illustrating a cathode reactive surface of a cathode separator including a generic fuel cell stack, and FIG. 2C is a drawing illustrating a cathode cooling surface of a cathode separator including a generic fuel cell stack.

In an anode separator 31 including a generic fuel cell stack as illustrated in FIG. 2A, an anode reactive region 1$a$ having a channel for hydrogen flow is formed in middle region, and a plurality of manifolds 1$b$ are formed in the regions on both sides of the anode reactive region 1$a$. Here, a plurality of six manifolds 1$b$ are provided, each letting in or out hydrogen, air or cooling water.

Between the anode reactive region 1$a$ and a hydrogen inlet manifold 1$b'$ among the plurality of manifolds 1$b$ formed on the anode separator 31, hydrogen inlet channels 31$a$ which direct hydrogen flowing through the hydrogen inlet manifold 1$b'$ to the anode reactive region 1$a$ are formed.

Here, a plurality of hydrogen inlet channels 31$a$ are formed to protrude and penetrate in the direction of the anode reactive surface. Also, at a point separated by a certain distance from the hydrogen inlet channels 31$a$, a plurality of supporting protrusions 31$b$ formed to protrude in the direction of the anode reactive surface may be formed. Accordingly, when a fuel cell stack is stacked, a frame (hereinafter referred to as "sub-gasket 10'") which encompasses and supports the membrane-electrode assembly 10 comes into contact with and supports the plurality of hydrogen inlet channels 31$a$ protruding out from the anode separator 31 and their supporting protrusions 31$b$.

Furthermore, a gasket forming an airtight line is not formed on the anode separator 31.

Meanwhile, on the cathode separator 32 including a generic fuel cell stack as illustrated in FIG. 2B and FIG. 2C, a cathode reactive region 2$a$ in which channels for air flow are formed is formed in a middle region, with a plurality of manifolds 2$b$ formed on both sides of the cathode reactive region 2$a$. Here, as with the anode separator 31, a plurality of six manifolds 2$b$ are formed, each letting in or out hydrogen, air or cooling water.

Between the air inlet manifolds 2$b'$ among the plurality of manifolds 2$b$ formed on the cathode separator 32 and the cathode reactive region 2$a$, air inlet channels 32$a$ which direct air flowing through the air inlet manifolds 2$b'$ to the cathode reactive region 2$a$ are formed.

Meanwhile, a gasket 40 of various forms is formed on the cathode separator 32 to maintain airtightness while forming channels for flow of hydrogen, air or cooling water.

For example, as shown in FIG. 2B, an external airtight line 41 which encompasses the plurality of manifolds 2b and the cathode reactive region 2a while contacting with the anode separator 31 is formed on the cathode reactive surface of the cathode separator 32. Furthermore, an internal airtight line 42 which encompasses the cathode reactive region 2a and provides a path for air to enter and which is in contact with the sub-gasket 10' is formed.

Furthermore, as shown in FIG. 2C, an airtight line 43 which provides a path for entry of cooling water and a path for entry of air and which is in contact with the anode separator 31 is formed on the cathode cooling surface of the cathode separator 32.

Accordingly, a unit cell is comprised by stacking the sub-gasket 10' between the anode separator 31 and cathode separator 32.

FIG. 3 is a drawing illustrating a unit cell including a generic fuel cell stack.

As illustrated in FIG. 3, in a unit cell including a generic fuel cell stack, a sub-gasket 10' is stacked between an anode reactive surface of an anode separator and a cathode reactive surface of a cathode separator 32. Here, the two faces of the sub-gasket 10' are respectively positioned on the anode reactive region 1a of the anode separator 31 and the cathode reactive region 2a of the cathode separator 32.

Meanwhile, the cathode cooling surface of the cathode separator 32 is arranged and stacked to face the anode cooling surface of the anode separator 31 which includes the adjacent unit cell.

FIG. 4 is a drawing illustrating a cross section of a hydrogen inlet region in a generic fuel cell stack. Here, FIG. 4 is a cross section showing the cross section of the region corresponding to A-A' illustrated in FIG. 2A and FIG. 2 with two unit cells stacked.

As illustrated in FIG. 4, an anode separator 31, sub-gasket 10' and cathode separator 32 are stacked in succession to form a single unit cell, and a plurality of unit cells are stacked in the same arrangement to include a fuel cell stack.

Here, the region of the sub-gasket 10' where hydrogen flows is separated from the anode reaction surface of the anode separator 31 to provide a path for hydrogen flow. Provided, that the edge of the sub-gasket 10' is bent in the region where the hydrogen inlet channel 31a is formed, to be in closed contact with and be supported by the anode reaction surface of the anode separator 31. Here, the hydrogen inlet channel 31a is formed to protrude from the anode separator 31 in the direction of the anode reaction surface, and therefore the sub-gasket 10' comes in close contact with the hydrogen inlet channel 31.

In the present state, air flows to the cathode reaction surface of the cathode separator 32, and the pressure from the flowing air presses the sub-gasket 10' toward the anode separator 31.

Here, a space for hydrogen flow is formed on the region of the anode separator 31 where the hydrogen inlet channel 31a is formed, and because it is in close contact with the sub-gasket 10', a problem is caused, wherein the pressure from air is focused, causing deformation.

Such deformation of the hydrogen inlet channel 31a causes the problem of the space S1 through which hydrogen passes from the anode cooling surface to the anode reactive surface becomes narrow or blocked.

Another problem caused by deformation of the hydrogen inlet channel 31a is a reduction to the spacing S2 between the anode separator and cathode separator 32, reducing the space for hydrogen inflow.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a separator assembly for a fuel cell able to prevent deformation of a separator due to a flow pressure of a reaction gas at a hydrogen inlet, and a fuel cell stack including the same.

The separator assembly for a fuel cell according to various exemplary embodiments of the present disclosure includes: an anode separator on a first face of which is formed at an anode reactive surface over which hydrogen flows to allow for hydrogen and oxygen to react and on a second face of which is formed at an anode cooling surface where cooling occurs; a cathode separator on a first face of which is formed a cathode reactive surface positioned to face the anode reactive surface of the anode separator, over which oxygen flows to allow for hydrogen and oxygen to react, and on a second face of which is formed a cathode cooling surface where cooling occurs; and a reinforcing plate which is positioned in a region of the anode separator where hydrogen enters, preventing deformation of the anode separator.

A gasket for airtightness is not formed on the anode separator, and gaskets for airtightness are formed on the cathode reactive surface and cathode cooling surface of the cathode separator.

In the middle region of the anode separator, a channel for hydrogen flow is formed, with a plurality of manifolds formed in the regions on both sides of the anode reactive region, where one of the manifolds is a hydrogen inlet manifold, and the reinforcing plate is positioned between the hydrogen inlet manifold and the anode reactive region.

The reinforcing plate is positioned on the anode reactive surface of the anode separator.

Formed on the anode separator between the hydrogen inlet manifold and the anode reactive region are a plurality of hydrogen inlet channels which protrude and penetrate in the direction of the anode reactive surface so that the hydrogen entering through the hydrogen inlet manifold passes through from the anode cooling surface to the anode reactive surface and flows to the anode reactive region, and the reinforcing plate is positioned to be supported by the hydrogen inlet channels of the anode separator.

Formed on the anode separator are a plurality of supporting protrusions, protruding in the direction of the anode reactive surface and separated by a predetermined distance from the hydrogen inlet channels in the direction of the anode reactive region, and the reinforcing plate is positioned to be supported by the supporting protrusions of the anode separator.

On the anode separator, the hydrogen inlet channels and supporting protrusions protrude to the same height, or the hydrogen inlet channels protrude to a height lower than the height of the supporting protrusions.

On the anode separator, a plurality of the hydrogen inlet channels are formed in the shape of long slits along the width of the anode separator, perpendicular to the direction of hydrogen flow, and the plurality of supporting protrusions is formed along lines parallel with the hydrogen inlet channels with a separation in the width direction of the anode separator.

On the cathode reactive surface of the cathode separator, a first gasket and a second gasket for forming an airtight seal with the anode separator are formed in a region on the outside the line formed by the hydrogen inlet channels on the anode separator, and a third gasket for forming an airtight seal with the reinforcing plate is formed in a region on the inside.

The height of the third gasket is lower than the height of the first gasket and the second gasket.

On the cathode cooling surface of the cathode separator, a fourth gasket is formed in a position corresponding to the third gasket.

At least one coupling groove formed to protrude in the direction of the anode cooling surface is formed on the anode separator, and on the reinforcing plate at least one coupling protrusion which is inserted into and coupled with the coupling groove is formed.

On the anode separator, a plurality of slits are formed along the width of the anode separator and perpendicular to the direction of hydrogen flow, and the at least one coupling groove formed on the reinforcing plate is formed on the line formed by the hydrogen inlet channels.

Meanwhile, the fuel cell stack according to various exemplary embodiments of the present disclosure is a fuel cell stack comprised of a stack of a membrane-electrode assembly, a pair of gas diffusion layers, and a plurality of unit cells each comprised of an anode separator and a cathode separator, wherein a sub gasket is provided to surround and support the membrane-electrode assembly, the anode separator of one unit cell is joined to the cathode separator of an adjacent unit cell to form one piece; an anode reactive surface over which hydrogen flows to allow hydrogen and air to react is formed on one face of the anode separator, and an anode cooling surface where cooling occurs is formed on the other face; a cathode reactive surface over which air flows to allow for hydrogen and air to react is formed on one face of the cathode separator to face the anode reactive surface of the anode separator, and a cathode cooling surface where cooling occurs is formed on the other face; and a reinforcing plate preventing deformation of the anode separator and the sub gasket is additionally positioned in a region of the anode separator where hydrogen enters.

A gasket for airtightness is not formed on the anode separator, and gaskets for airtightness are formed on the cathode reactive surface and cathode cooling surface of the cathode separator.

According to exemplary embodiments of the present disclosure, by positioning a reinforcing plate preventing deformation of an anode separator in a region of the anode separator where a hydrogen inlet channel is formed, deformation of the anode separator due to deformation of a sub-gasket in the region of the anode separator where a hydrogen inlet channel is formed due to pressure from air flowing at the cathode separator may be prevented. Accordingly, narrowing or blockage of a path through which hydrogen enters may be prevented.

Furthermore, by forming a coupling groove to which the reinforcing plate is coupled to protrude in the direction of an anode cooling surface of the anode separator, deformation of the anode separator when stacking may be prevented.

Also, by forming the reinforcing plate in the shape of a flat plate, even surface pressure may be formed when stacking.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 2B is a drawing illustrating the cathode reactive surface of a cathode separator including a generic fuel cell stack.

Figure 1:
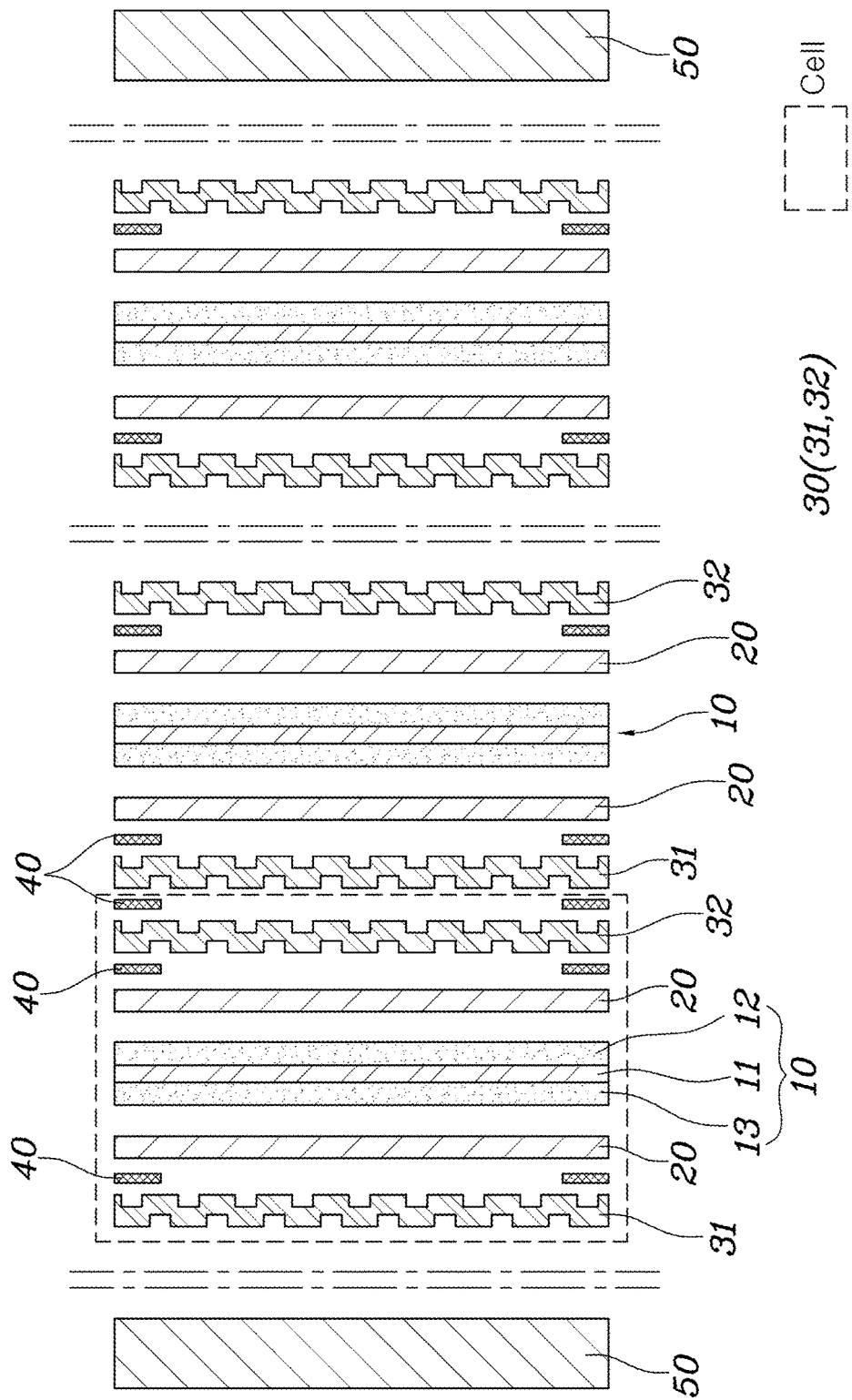
FIG. 1 is a drawing illustrating the configuration of a generic fuel cell stack.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following, embodiments of the present disclosure will be described in further detail with reference to the appended drawings. However, the present disclosure is not limited to the exemplary embodiments disclosed in the following and may be realized in various different forms, and these embodiments are provided to provide a more complete disclosure of the present disclosure and inform persons having ordinary skill in the art of the full scope of the present disclosure. In the drawings, like symbols indicate like elements.

The fuel cell stack according to various exemplary embodiments of the present disclosure maintains the configuration of the fuel cell stack as illustrated in FIG. 1 while additionally positioning a reinforcing plate on the anode separator to prevent deformation of the anode separator.

In the fuel cell stack according to various exemplary embodiments of the present disclosure, as illustrated in FIG. 1, each unit cell includes a membrane-electrode assembly 10, a pair of gas diffusion layers 20, and an anode separator 31 and a cathode separator 32, and the stack includes a plurality of cells connected serially. Therefore, the anode separator 31 of a provided unit cell is positioned to face the cathode separator 32 of the adjacent unit cell, but in an exemplary embodiment of the present disclosure the facing anode separator and cathode separator are joined into a single piece to form a separator assembly. Here, around the membrane-electrode assembly 10, a frame which encompasses and supports the membrane-electrode assembly (hereinafter referred to as "sub-gasket 10'"") is provided.

Accordingly, in the following description, redundant description of a generic fuel cell stack and unit cells will be omitted.

Figure 5:
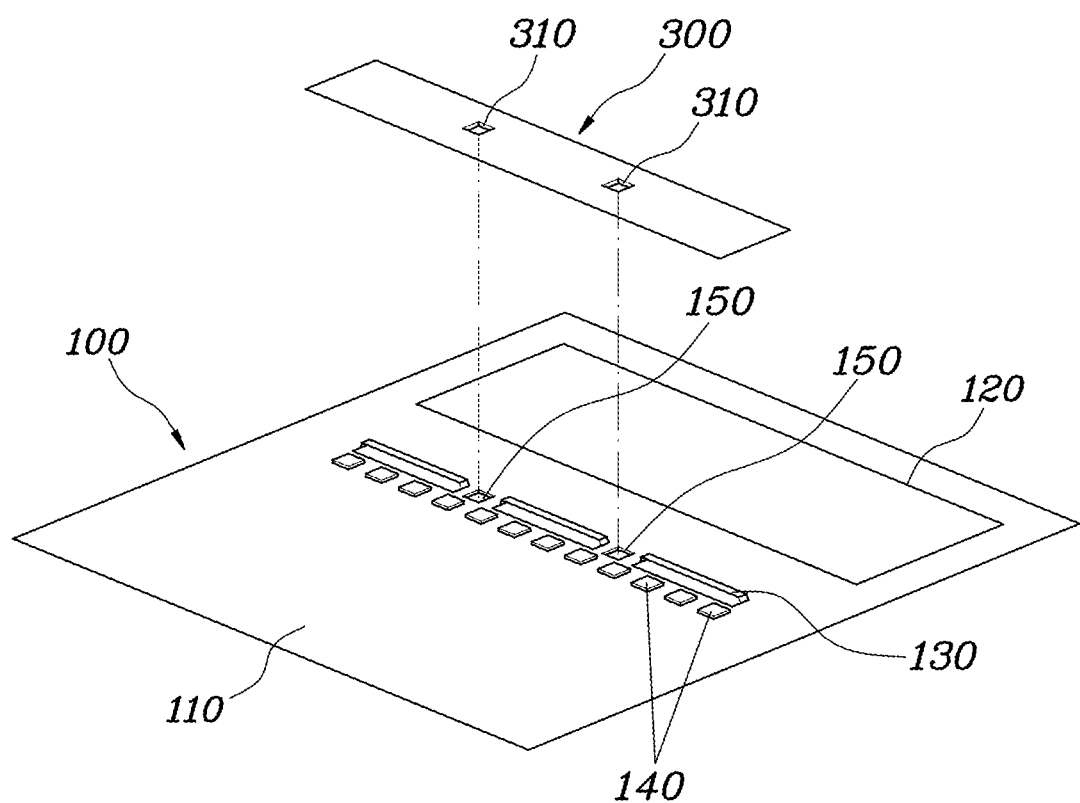
FIG. 5 is a drawing illustrating essential portions of the anode separator and reinforcing plate including the separator assembly for a fuel cell according to various exemplary embodiments of the present disclosure.
Figure 6:
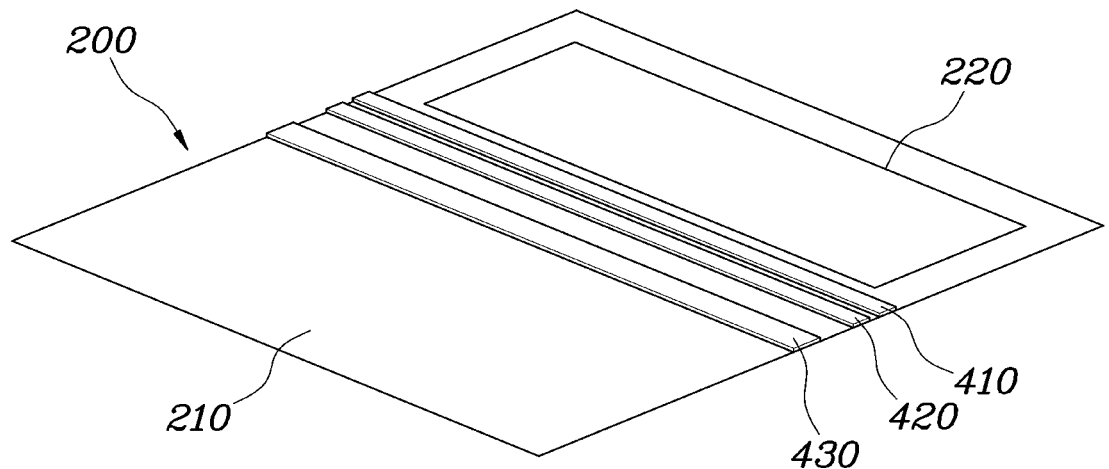
FIG. 6 is a drawing illustrating essential portions of the cathode separator including the separator assembly for a fuel cell according to various exemplary embodiments of the present disclosure.
Figure 7A:
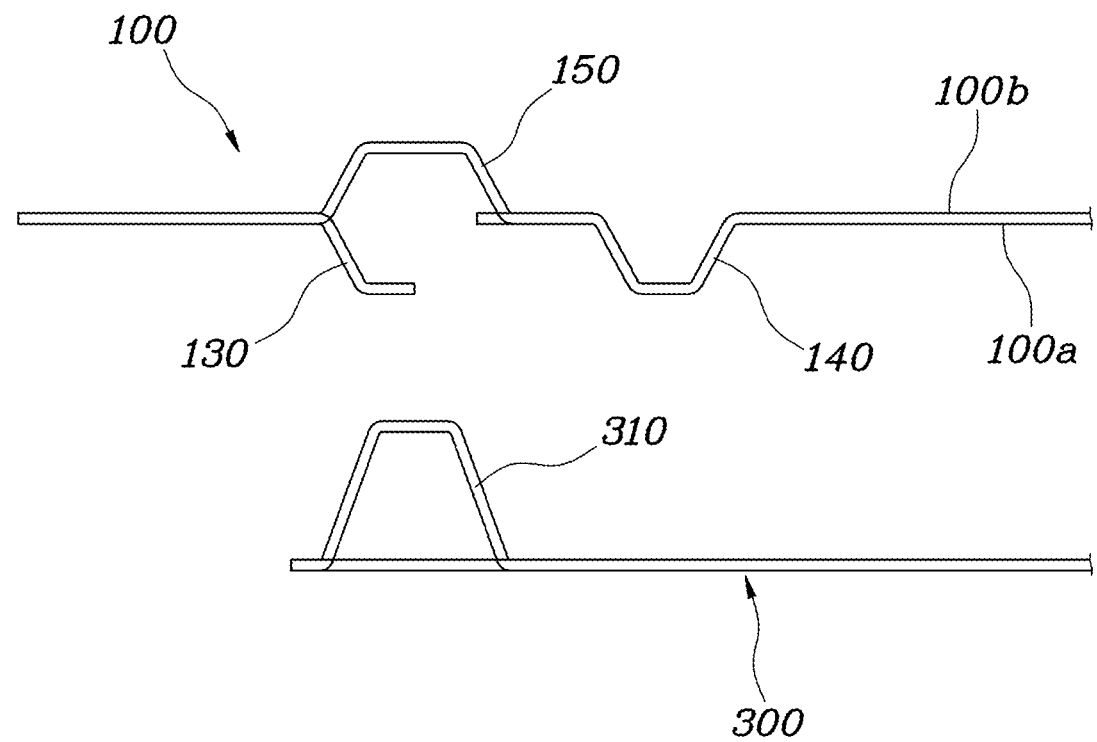
FIG. 7A and FIG. 7B are drawings illustrating the coupling relationship between the anode separator and reinforcing plate including the separator assembly for a fuel cell according to various exemplary embodiments of the present disclosure.
Figure 7B:
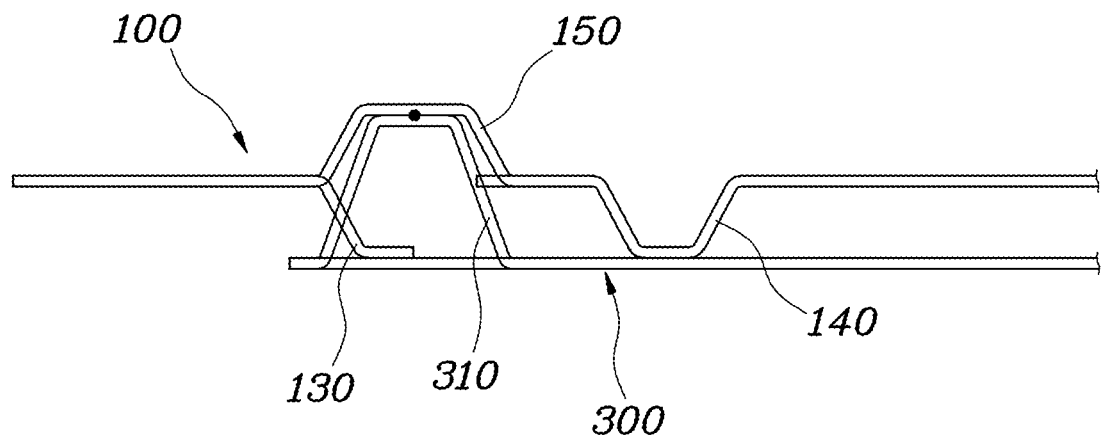
Figure 8:
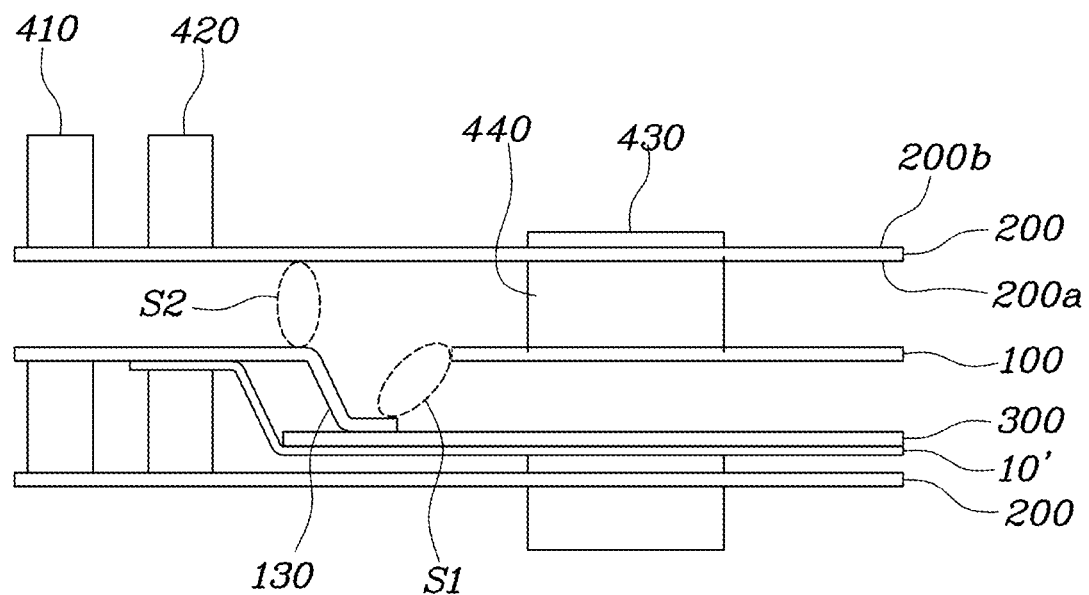
FIG. 8 is a drawing illustrating a cross section of the hydrogen inlet region in a fuel cell stack according to various exemplary embodiments of the present disclosure.

FIG. 5 is a drawing illustrating essential portions of the anode separator and reinforcing plate including the separator assembly for a fuel cell according to various exemplary embodiments of the present disclosure, FIG. 6 is a drawing illustrating essential portions of the cathode separator including the separator assembly for a fuel cell according to various exemplary embodiments of the present disclosure, FIG. 7A and FIG. 7B are drawings illustrating the coupling relationship between the anode separator and reinforcing plate including the separator assembly for a fuel cell according to various exemplary embodiments of the present disclosure, and FIG. 8 is a drawing illustrating a cross section of the hydrogen inlet region in a fuel cell stack according to various exemplary embodiments of the present disclosure.

As illustrated in the drawings, the separator assembly for a fuel cell according to an exemplary embodiment of the exemplary embodiment includes: a first separator 100 (hereinafter referred to as a "anode separator") on one face of which is formed with a first reactive surface 100a (hereinafter referred to as a "anode reactive surface") over which first reaction gas (hereinafter referred to as a "hydrogen") flows to allow hydrogen and second reaction gas (hereinafter referred to as a "air") to react, and on the other face of which is formed at a first cooling surface 100b (hereinafter referred to as a "anode cooling surface") where cooling occurs; a second separator 200 (hereinafter referred to as a "cathode separator") on one face of which is formed a second reactive surface 200b (hereinafter referred to as a "cathode reactive surface") over which air flows to allow for hydrogen and air to react, and on the other face of which is formed a second cooling surface 200a (hereinafter referred to as a "cathode cooling surface") where cooling occurs; and a reinforcing plate 300 positioned in a region of the anode separator 100 where hydrogen enters to prevent deformation of the anode separator 100.

A gasket for airtightness is not formed on the anode separator 100, and gaskets for airtightness 410 to 440 are formed on the cathode reactive surface 200b and the cathode cooling surface 200a of the cathode separator 200.

Figure 2A:
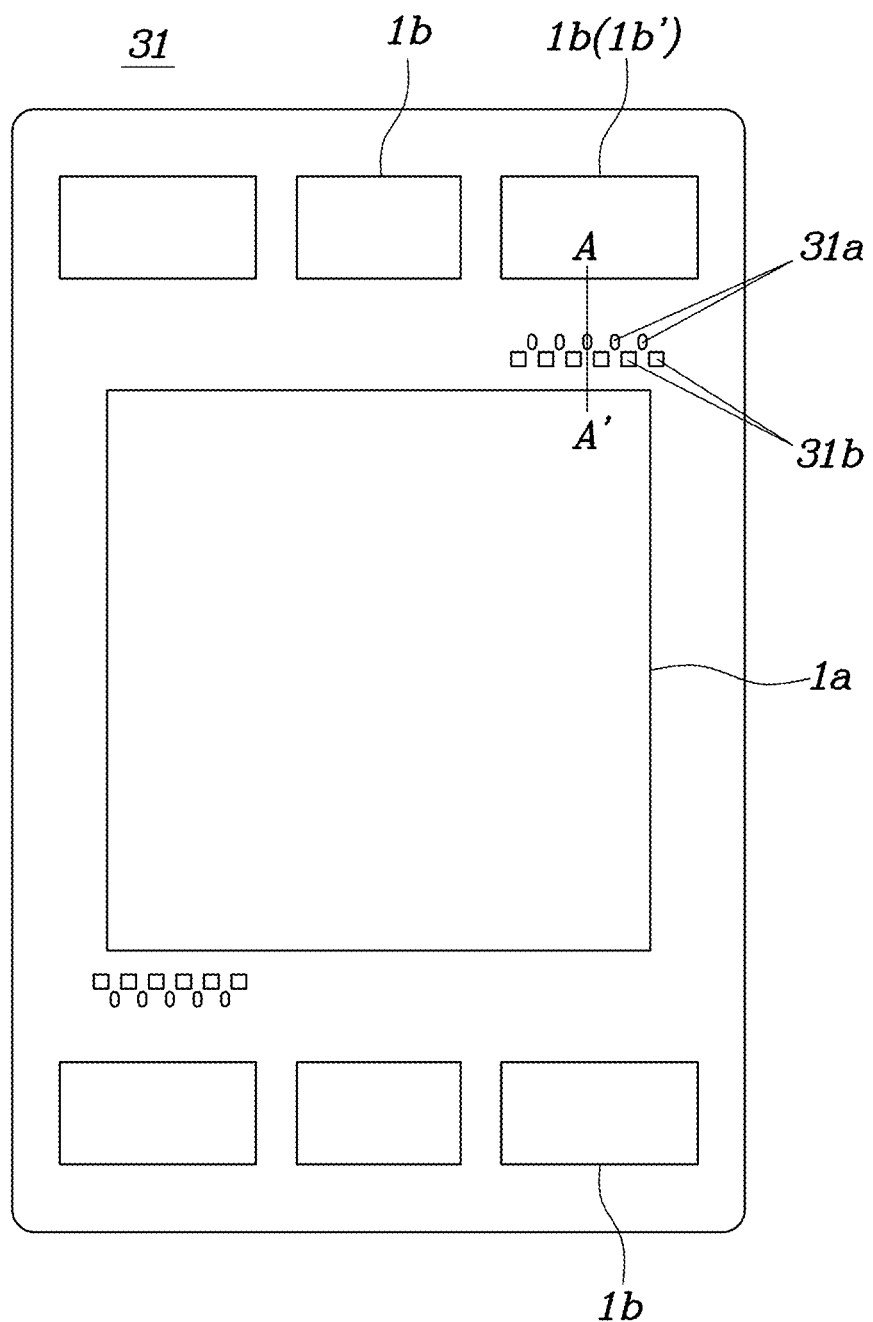
FIG. 2A is a drawing illustrating an anode separator including a generic fuel cell stack.
Figure 2C:
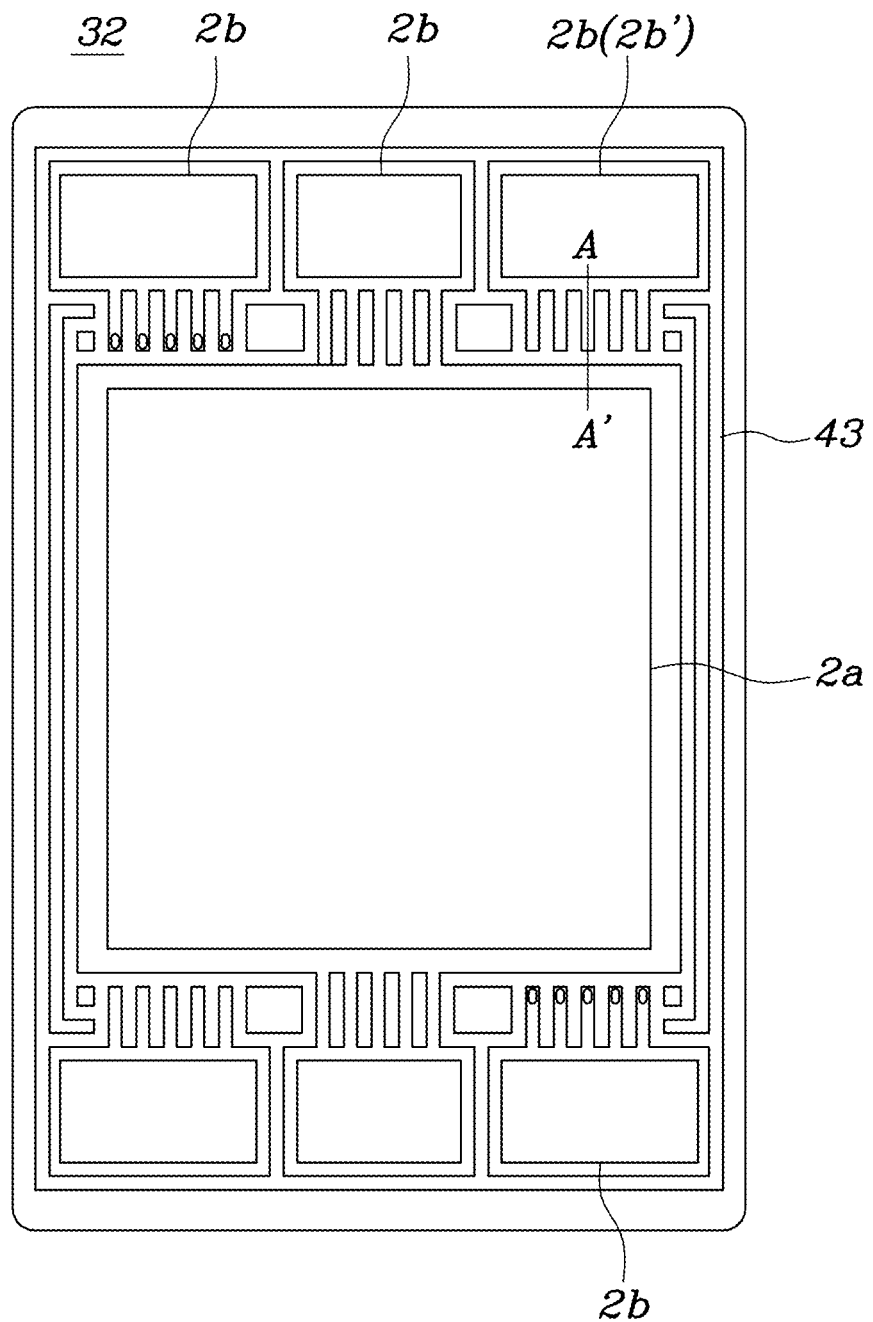
FIG. 2C is a drawing illustrating the cathode cooling surface of a cathode separator including a generic fuel cell stack.
Figure 3:
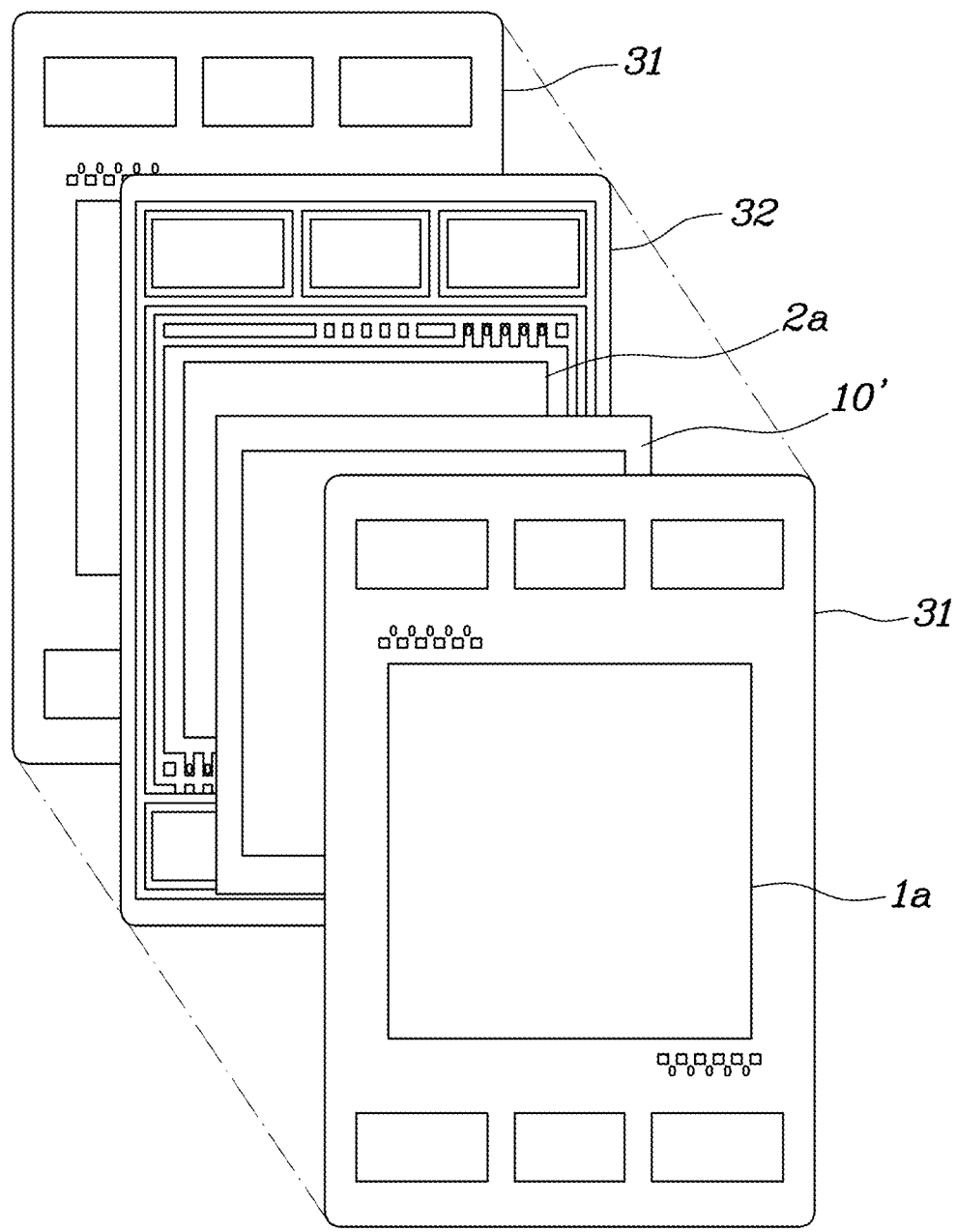
FIG. 3 is a drawing illustrating a unit cell including a generic fuel cell stack.
Figure 4:
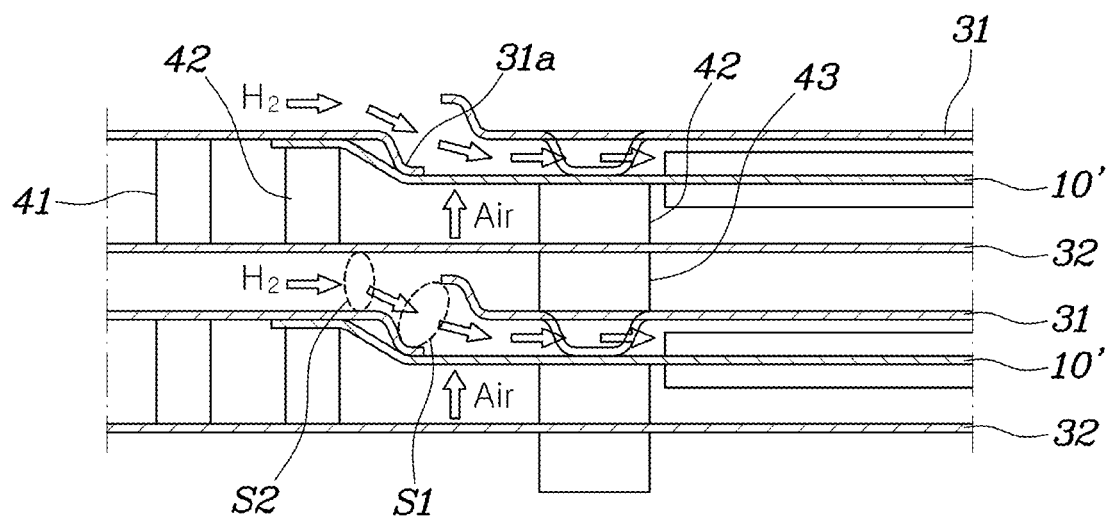
FIG. 4 is drawings illustrating cross sections of a hydrogen inlet region in a generic fuel cell stack.

Here, the anode separator 100 and the cathode separator 200 retain as-is the elements of a conventional anode separator 31 and cathode separator 32 illustrated in FIG. 2A to FIG. 2C.

Additional structural modification may be made to the anode separator 100 for coupling with the reinforcing plate 300.

To elaborate as illustrated in FIG. 2A, an anode reactive region 110 in the middle region of which channels for hydrogen flow are formed is formed on the anode separator 100, and a plurality of manifolds is formed in regions on first and second sides of the anode reactive region 110. Here, one of the manifolds is a hydrogen inlet manifold 120 through which hydrogen enters.

Furthermore, on the anode separator 100, between the hydrogen inlet manifold 120 and the anode reactive region 110 are formed a plurality of hydrogen inlet channels 130 protruding and penetrating in the direction of the anode reactive surface 100a so that hydrogen entering through the hydrogen inlet manifold 120 passes through from the anode cooling surface 100b to the anode reactive surface 100a and flows to the anode reactive region 110.

Here, a plurality of hydrogen inlet channels 130 are formed in the shape of long slits extending along the widthwise direction of the anode separator 100. Accordingly, the plurality of hydrogen inlet channels 130 are formed along the widthwise direction of the anode separator 100 and perpendicular to the direction of hydrogen flow.

Furthermore, on the anode separator 100 are formed a plurality of supporting protrusions 140 which are separated from the hydrogen inlet channels 130 by a predetermined distance in the direction of the anode reactive region 110 and formed to protrude in the direction of the anode reactive surface 100a.

Here, the plurality of supporting protrusions 140 are separated in the widthwise direction of the anode separator 100 to be formed on a line parallel to the line formed by the hydrogen inlet channels 130.

The hydrogen inlet channels 130 and supporting protrusions 140 may protrude to the same height, or the hydrogen inlet channel 130 may protrude to a height lower than the height of the supporting protrusions 140. Accordingly, the hydrogen inlet channels 130 and supporting protrusions 140 may, protruding to the same height from the reinforcing plate 300, allow for uniform surface pressure to be formed in the region when the fuel cell stack is stacked, or the hydrogen inlet channels 130 may be separated by a certain distance from the reinforcing plate 300, with the supporting protrusions 140 supporting the reinforcing plate 300 to minimize deformation of the hydrogen inlet channels 130.

Furthermore, for alignment and firm coupling of the reinforcing plate 300, at least one coupling groove 150 formed to protrude in the direction of the anode cooling surface 100b is formed on the anode separator 100.

Here, the coupling groove 150 is formed in parallel to the line on which the hydrogen inlet channels 130 are formed. At least two coupling grooves 150 are formed for alignment of the reinforcing plate 300. Accordingly, the coupling grooves may be formed between the plurality of hydrogen inlet channels 130 or at the outermost points on the line on which the hydrogen inlet channels 130 are formed.

Furthermore, the height of the coupling groove 150 is formed to a height corresponding to the spacing between an anode separator 100 and an adjacently positioned cathode separator 200. Accordingly, the coupling groove 150 supports the cathode cooling surface 200a of the adjacently positioned cathode separator 200.

Meanwhile, the reinforcing plate 300 is a means of reinforcing the weak region of an anode separator 100 where the hydrogen inlet channels 130 are formed. As shown in FIG. 5, the reinforcing plate 300 takes on an overall flat sheet shape.

Furthermore, as the reinforcing plate 300 also plays a role of preventing deformation of the sub-gasket 10', it is positioned on the anode reactive surface 100a side of the anode separator 100.

Therefore, as shown in FIG. 7A and FIG. 7B, the reinforcing plate 300 is supported simultaneously by the hydrogen inlet channels 130 of the anode separator 100 and by the supporting protrusions 140, allowing for uniform surface pressure to be formed on the sub-gasket 10'. Obviously, in a case where the hydrogen inlet channels 130 protrude to a height lower than the height of the supporting protrusions 140, the reinforcing plate 300 may be supported only by the supporting protrusions 140 of the anode separator 100.

Furthermore, on the reinforcing plate 300, at least one coupling protrusion 310 which is inserted into and couples to the coupling groove 150 formed on the anode separator 100 is formed.

Here, the coupling protrusion 310 is formed to a height equal to the sum of the height of the supporting protrusion 140 formed on the anode separator 100 and the height of the coupling groove 150.

Accordingly, when the coupling protrusion 310 of the reinforcing plate 300 is inserted into the coupling groove 150 of the anode separator 100, the top portion of the coupling protrusion 310 comes into contact with and is welded to the coupling groove 150, with the flat region of the reinforcing plate 300 supported only by the supporting protrusion 140 of the anode separator 100 or simultaneously by the hydrogen inlet channel 130 and the supporting protrusion 140.

Meanwhile, as illustrated in FIG. 2B and FIG. 2C, a cathode reactive region 210 on which channels for air flow are formed is formed in the middle region of the cathode separator 200, and a plurality of manifolds 220 are formed in the regions on both sides of the cathode reactive region 210.

As shown in FIG. 6 and FIG. 8, gaskets 410 to 440 for airtightness are formed on the cathode reactive surface 200b and the cathode cooling surface 200a of the cathode separator 200.

On the cathode reactive surface 200b of the cathode separator 200, a first gasket 410 and a second gasket 420 for forming an airtight seal with the anode separator 100 are formed in a region outside the line formed by the hydrogen inlet channels 130 on the anode separator 100, and a third gasket 430 for forming an airtight seal with the reinforcing plate 300 is formed in the region inside the line.

Here, the first gasket 410 maintains airtightness between the cathode separator 200 and the anode separator 100, and the second gasket 420 and third gasket 430 maintain airtightness between the cathode separator 200 and the sub-gasket 10'.

The height of the third gasket 430 is lower than the heights of the first gasket 410 and the second gasket 420. Accordingly, the third gasket 430 maintains airtightness with the sub-gasket 10' which is supported by the cathode separator 200 and the reinforcing plate 300.

Furthermore, a fourth gasket 440 is formed on a position of the cathode cooling surface 200a of the cathode separator 200 corresponding to the position of the third gasket 430, maintaining airtightness between the cathode separator 200 and the anode separator 100 of an adjacently positioned unit cell.

When the separator assembly for a fuel cell configured as described in the above is stacked, as shown in FIG. 8, even when air flows over the cathode reactive surface 200b of the cathode separator 200 and the pressure from the air presses the sub-gasket 10' in the direction of the anode separator 31, the reinforcing plate 300 is able to prevent its deformation.

Accordingly, it is possible to prevent deformation of the hydrogen inlet channels 130 of the anode separator 100, and as a result it is possible to prevent the problem of the space S1 through which hydrogen passes from the anode cooling surface 100b to the anode reactive surface 100a narrowing or becoming blocked.

Furthermore, it is possible to prevent the problem of the space S2 between the anode separator 100 and the cathode separator 200 becoming narrower as the hydrogen inlet channels 130 are deformed, narrowing the space for hydrogen to enter.

Furthermore, in the separator assembly for a fuel cell, as the coupling protrusion 310 of the reinforcing plate 300 is inserted into the coupling groove 150 of the anode separator 100 as shown in FIG. 7, an effect in which the space S2 between the anode separator 1 and the cathode separator plate 200 is supported to be maintained is expected.

Meanwhile, whereas the reinforcing plate has been referred to as positioned between the hydrogen inlet manifolds and the anode reactive region in an exemplary embodiment of the present disclosure, the reinforcing plate may be positioned both between the hydrogen inlet manifolds and the anode reactive region and simultaneously between the hydrogen outlet manifolds from which hydrogen is discharged and the anode reactive region.

Furthermore, in the present exemplary embodiment of the present disclosure, it has been described that the gasket for airtightness is not formed on the anode separator, the gaskets for airtightness are formed on the cathode reactive surface and cathode cooling surface of the cathode separator. However, contrary to the present exemplary embodiment of the present disclosure, the gasket for airtightness may not be formed on the cathode separator, but the gaskets for airtightness may be formed on the anode reactive surface and anode cooling surface of the anode separator.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A separator assembly for a fuel cell, the assembly comprising:
    a first separator on a first face of which is formed with a first reactive surface over which a first reaction gas flows to allow the first reaction gas and a second reaction gas to react, and on a second face of which is formed with a first cooling surface where cooling occurs;
    a second separator on a first face of which is formed with a second reactive surface over which the second reaction gas flows to allow for the first reaction gas and the second reaction gas to react, and on a second face of which is formed with a second cooling surface where cooling occurs; and
    a reinforcing plate prevent deformation of the first separator,
    wherein the first separator forms a first reaction gas inlet channel, the first separator includes a bent portion bent toward the reinforcing plate and the first reaction gas inlet channel is formed between the bent portion and the first reactive surface of the first separator,
    wherein the first reaction gas is introduced through the first reaction gas inlet channel, and
    wherein the reinforcing plate directly supporting the bent portion of the first separator is arranged to support the bent portion of the first separator on a first reactive surface side of the first reactive surface, forming a flow path of the first reaction gas between the reinforcing plate and the first separator.

2. The separator assembly of claim 1, wherein a gasket for airtightness is not formed on the first separator, and gaskets for airtightness are formed on the second reactive surface and the second cooling surface of the second separator.

3. The separator assembly of claim 2,
    wherein an anode reactive region in a middle region of which channels for the flow path of the first reaction gas are formed is formed on the first separator, and a plurality of manifolds is formed in regions on first and second sides of the anode reactive region, and
    wherein one of the manifolds is a first reaction gas inlet manifold through which the first reaction gas enters, and
    wherein the reinforcing plate is positioned between the first reaction gas inlet manifold and the anode reactive region.

4. The separator assembly of claim 3, wherein the reinforcing plate is positioned on the first reactive surface side of the first separator.

5. The separator assembly of claim 3, wherein the first reaction gas inlet channel is formed on the first separator, between the first reaction gas inlet manifold and the anode reactive region so that the first reaction gas entering through the first reaction gas inlet manifold passes through from the first cooling surface to the first reactive surface and flows to the anode reactive region, and the reinforcing plate supports and is positioned on a plurality of first reaction gas inlet channels of the first separator.

6. The separator assembly of claim 5, wherein, on the first separator, a plurality of supporting protrusions is separated from the plurality of first reaction gas inlet channels by a predetermined distance in a direction of the anode reactive region and formed to protrude from the first reactive surface, and the reinforcing plate supports and is positioned on the supporting protrusions of the first separator.

7. The separator assembly of claim 6, wherein, on the first separator, the plurality of first reaction gas inlet channels and the plurality of supporting protrusions protrude to a same height, or the first reaction gas inlet channels protrude to a height lower than a height of the supporting protrusions.

8. The separator assembly of claim 6, wherein the plurality of first reaction gas inlet channels is formed in a shape of slits extending along a widthwise direction of the first separator, and the plurality of supporting protrusions is separated along the widthwise direction of the first separator and formed on a line parallel to a line formed by the first reaction gas inlet channels.

9. The separator assembly of claim 8,
    wherein the gaskets include a first gasket, a second gasket and a third gasket, and
    wherein, on the second reactive surface of the second separator, the first gasket and the second gasket for forming an airtight seal with the first separator are formed in a region outside the line formed by the first reaction gas inlet channels on the first separator, and the third gasket for forming an airtight seal with the reinforcing plate is formed in a region inside the line formed by the first reaction gas inlet channels on the first separator.

10. The separator assembly of claim 9, wherein a height of the third gasket is lower than a height of the first gasket and a height of the second gasket.

11. The separator assembly of claim 9,
    wherein the gaskets further include a fourth gasket, and
    wherein the fourth gasket is formed on a position of the second cooling surface of the second separator corresponding to a position of the third gasket.

12. The separator assembly of claim 5, wherein the first separator protrudes from the first cooling surface to form at least one coupling groove, and at least one coupling protrusion which is inserted into and couples to the at least one coupling groove is formed on the reinforcing plate.

13. The separator assembly of claim 12, wherein, on the first separator, the plurality of first reaction gas inlet channels is formed in a shape of slits extending along a widthwise direction of the first separator and are formed in a line perpendicular in a direction of the first reaction gas flow, and the at least one coupling groove formed on the first separator is formed on a line formed by the first reaction gas inlet channels.

14. The separator assembly of claim 1, wherein the first separator is an anode separator, the first reaction gas is hydrogen, the second separator is a cathode separator, and the second reaction gas is air.

15. A stack for a fuel cell made by stacking a membrane-electrode assembly, a pair of gas diffusion layers, and a plurality of unit cells each including a first separator and a second separator,
    wherein a sub gasket is provided to surround and support the membrane-electrode assembly,
    wherein the first separator of one unit cell is joined to the second separator of an adjacent unit cell to form one piece;
    wherein a first reactive surface over which a first reaction gas flows to allow the first reaction gas and a second reaction gas to react is formed on a first face of the first separator, and a first cooling surface where cooling occurs is formed on a second face of the first separator;
    wherein a second reactive surface over which the second reaction gas flows to allow for the first reaction gas and the second reaction gas to react is formed on a first face of the second separator to face the first reactive surface of the first separator, and a second cooling surface where cooling occurs is formed on a second face of the second separator; and wherein the stack further includes a reinforcing plate preventing deformation of the first separator, wherein the first separator forms a first reaction gas inlet channel, the first separator includes a bent portion bent toward the reinforcing plate and the first reaction gas inlet channel is formed between the bent portion and the first reactive surface of the first separator, wherein the first reaction gas is introduced through the first reaction gas inlet channel, and wherein the reinforcing plate directly supporting the bent portion of the first separator is arranged to support the bent portion of the first separator on a side of the first reaction surface, forming a flow path for the first reaction gas between the reinforcing plate and the first separator.

16. The stack of claim 15, wherein a gasket for airtightness is not formed on the first separator, and gaskets for airtightness are formed on the second reactive surface and the second cooling surface of the second separator.

17. The stack of claim 16, wherein the gaskets include a first gasket, a second gasket and a third gasket, and wherein, on the second reactive surface of the second separator, the first gasket and the second gasket for forming an airtight seal with the first separator are formed in a region outside a line formed by a plurality of first reaction gas inlet channels on the first separator, and the third gasket for forming an airtight seal with the reinforcing plate is formed in a region inside the line.

18. The stack of claim 15, wherein the reinforcing plate is positioned on a first reactive surface side of the first separator.

19. The stack of claim 15, wherein the first separator is an anode separator, the first reaction gas is hydrogen, the second separator is a cathode separator, and the second reaction gas is air.

* * * * *